(12) United States Patent
Borland

(10) Patent No.: US 6,763,092 B1
(45) Date of Patent: Jul. 13, 2004

(54) METHOD AND APPARATUS FOR HANDLING INCOMING CALLS

(75) Inventor: David J. Borland, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/263,373

(22) Filed: Mar. 5, 1999

(51) Int. Cl.⁷ .................................................. H04M 1/64
(52) U.S. Cl. ............................... 379/88.21; 379/88.19; 379/142.01; 379/211.01
(58) Field of Search ........................... 379/88.2, 88.19, 379/142, 88.21, 142.01, 142.04, 142.06, 215.01, 211.01, 210.01; 340/632

(56) References Cited

U.S. PATENT DOCUMENTS

| | | | | |
|---|---|---|---|---|
| 5,200,994 A | * | 4/1993 | Sasano et al. ............... | 379/142 |
| 5,280,273 A | * | 1/1994 | Goldstein ................... | 340/632 |
| 5,651,053 A | * | 7/1997 | Mitchell ................. | 379/210.02 |
| 5,822,416 A | * | 10/1998 | Goodacre et al. ...... | 379/142.07 |
| 6,018,671 A | * | 1/2000 | Bremer ........................ | 455/567 |
| 6,047,057 A | * | 4/2000 | Weishut et al. ......... | 379/215.01 |
| 6,219,413 B1 | * | 4/2001 | Burg ...................... | 379/215.01 |
| 6,330,314 B1 | * | 12/2001 | Motooka ................. | 379/88.22 |
| 2001/0014599 A1 | * | 8/2001 | Henderson .................. | 455/412 |

* cited by examiner

*Primary Examiner*—Fan Tsang
*Assistant Examiner*—Ovidio Escalante
(74) *Attorney, Agent, or Firm*—Williams, Morgan & Amerson

(57) ABSTRACT

A method and telecommunications device is provided for accessing a telecommunications device feature. The method includes detecting an incoming call from a calling party, providing information identifying the calling party, and configuring the telecommunications device feature in response to the information identifying the calling party. The telecommunications device includes a means for receiving an incoming call from a calling party, a caller identification system capable of providing information identifying the calling party, and a control logic capable of configuring the telecommunications device feature in response to the information identifying the calling party.

15 Claims, 5 Drawing Sheets

US 6,763,092 B1

METHOD AND APPARATUS FOR HANDLING INCOMING CALLS

BACKGROUND OF THE INVENTION

1. Field of the Invention

This invention relates generally to telecommunication device interfaces, and, more particularly, to a telecommunication device interface for providing access to specialized telecommunications services for incoming calls.

2. Description of the Related Art

There is a current trend among telecommunications providers to offer specialized services to users for greater convenience, flexibility, and reliability. These specialized services may include Caller ID, Call Blocker, Specialized Ringing, Voice Message Recording (VMR), or the like.

To take advantage of the specialized services proffered by service providers, designers are implementing new features in existing telecommunications devices (e.g., telephones) that allow end users to quickly and conveniently access the aforementioned specialized services. For example, it is not uncommon to find telephones today having an integrated Caller ID feature that, in response to an incoming call, identifies the calling party and the telephone number of the calling party.

With the Caller ID feature becoming more prevalent in telephones today, designers of telephones are integrating additional "user friendly" options in the telephone itself that take advantage of the integrated Caller ID feature. That is, specialized services that have ordinarily been provided by service providers are routinely being integrated in the telephones supporting the Caller ID feature. For example, based on the information provided by the Caller ID for a given incoming call, an end user may customize a specialized ringing, call blocking, or other such features, for an incoming call number or name.

While telephones today support a multitude of features that, based on Caller ID, allow a user to quickly and easily access a variety of specialized services, these telephones suffer from at least one shortcoming, in that they are not readily configurable. That is, to take advantage of services such as call blocking, specialized ringing, call forwarding, and so forth, the end user must generally input each telephone number manually into a memory bank of a telephone and then configure the telephone number for a particular service or feature. Manually entering telephone numbers can sometimes prove to be a cumbersome and an error-prone process. It may be a cumbersome and an error-prone process because of the inordinate number of telephone numbers that must be manually entered into the telephone error-free over the course of time. Additionally, configuring the telephone may sometimes prove to be a challenge, especially in situations where the end user may have misplaced the instruction manual and cannot recall how to configure the telephone for the desired service or feature.

The present invention is directed to overcoming, or at least reducing the effects of, one or more of the problems set forth above.

SUMMARY OF THE INVENTION

In one aspect of the present invention, a method is provided for accessing a telecommunications device feature. The method includes detecting an incoming call from a calling party, providing information identifying the calling party, and configuring the telecommunications device feature in response to the information identifying the calling party.

In one aspect of the present invention, a telecommunications device is provided. The telecommunications device includes a means for receiving an incoming call from a calling party, a caller identification system capable of providing information identifying the calling party, and a control logic capable of configuring the telecommunications device feature in response to the information identifying the calling party.

BRIEF DESCRIPTION OF THE DRAWINGS

Other objects and advantages of the invention will become apparent upon reading the following detailed description and upon reference to the drawings in which.

Figure 1:
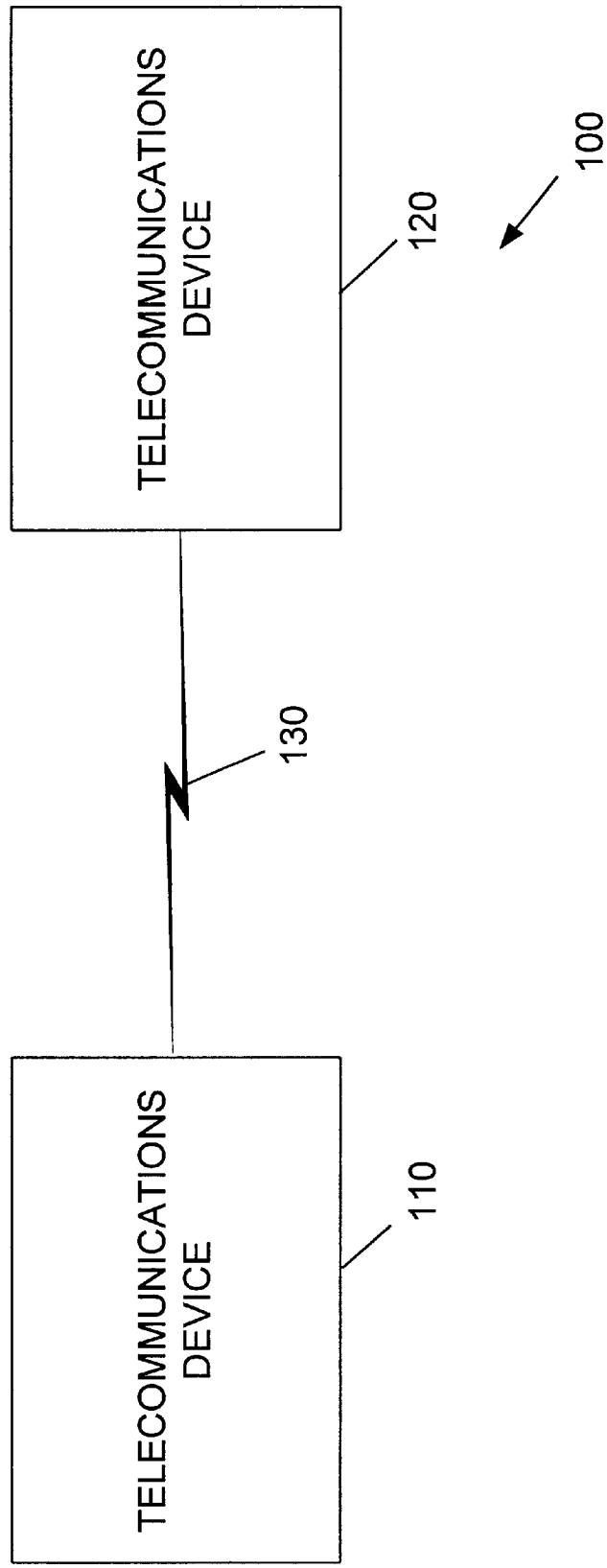
FIG. 1 is a block diagram of a communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the figures, and in particular to FIG. 1, a block diagram of a communications system 100 in accordance with the present invention is illustrated. FIG. 1 includes a first telecommunications device 110 coupled to a second telecommunications device 120 via a connection 130. The connection 130 may be a wire-line connection or a wire-less connection, depending on the application. In one embodiment, the first and second telecommunications devices 110, 120 may be a variety of available conventional telephones, such as cordless telephones, cellular telephones, wired telephones, and the like. In an alternative embodiment, the telecommunications devices 110, 120 may be any "device" capable of performing substantially an equivalent function of a conventional telephone, which may include, but not limited to, transmitting and/or receiving voice and data signals. Examples of the telecommunications devices 110, 120 include a data processing system (DPS) utilizing a modem to perform telephony, a television phone, a wireless local loop, a DPS working in conjunction with a telephone, Internet Protocol (IP) telephony, and the like. IP telephony is a general term for the technologies that use the Internet Protocol's packet-switched connections to exchange voice, fax, and other forms of information that have traditionally been carried over the dedicated circuit-switched connections of the public switched telephone network (PSTN). One example of IP telephony is an Internet Phone, a software program that runs on a DPS and simulates a conventional phone, allowing an end user to speak through a microphone and hear through the DPS speakers. The calls travel over the Internet as packets of data on shared lines, avoiding the tolls of the PSTN.

Figure 2:
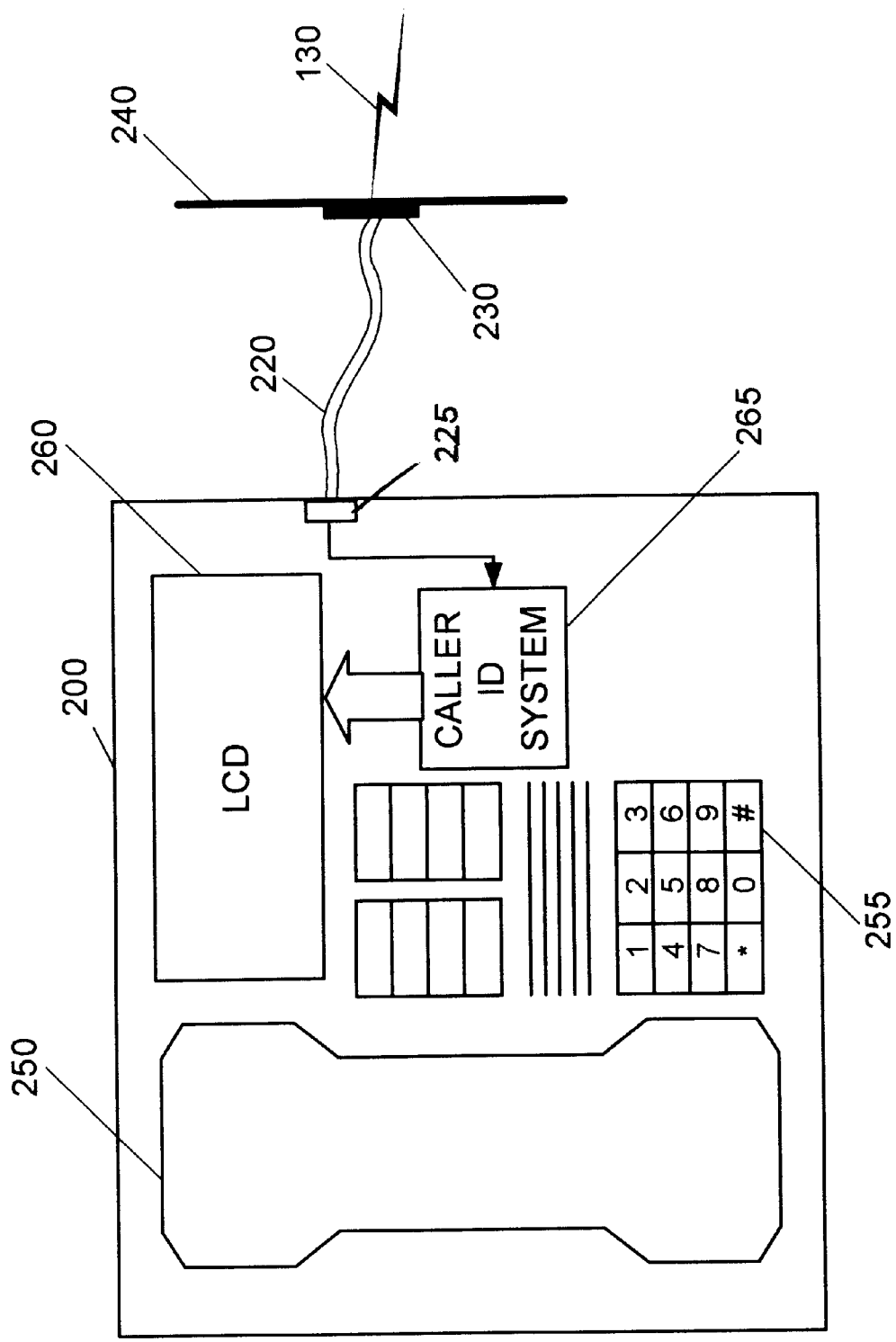
FIG. 2 illustrates a block diagram of a telephone that may be employed in the communications system of FIG. 1.

For illustrative purposes, in FIG. 2, the telecommunications device 110 of FIG. 1 is a wired telephone 200 coupled to a telephone line 220 via a telephone input/output interface 225, a telephone line interface 230 coupled to a fixed structure 240, and the connection 130 that connects the telephone 200 to another telecommunications device 120 (see FIG. 1). The fixed structure 240 can be, for example, a wall, and the telephone input/out interface 225 may be an RJ-11C connector. In the illustrated embodiment, the connection 130 may be a PSTN line, a Private Branch Exchange (PBX) line, or any other line capable of carrying analog or digital signals.

Those skilled in the art will appreciate that telephones 200 are well known in the art, and, as a result, will not be described in detail herein. The communications link between the telephone 200 and the remote telecommunications device 120 is generally made over the connection 130 through a central switching office (not shown) or a private branch circuit (not shown). The telephone 200 includes a handset 250 having a speaker (not shown) and microphone (not shown), wherein the handset 250 generally rests on a switchhook (not shown). As expected, an end user may utilize the telephone 200 by lifting the handset 250, dialing the telephone number of a remote telephone using a dial pad 255, and then communicating with the other party. For convenience and to reduce the possibility of accidentally dialing the phone number, the dialed phone number may be displayed in the Liquid Crystal Display (LCD) 260. Conversely, an end user may receive calls by lifting the handset 250 in response to a telephone ring. Because the telephone 200 includes a Caller ID system 265, the telephone number and/or name of the calling party appears in an LCD 260. The recipient of the call may or may not answer the incoming call based on the information provided by the Caller ID system 265. The telephone 200 in the illustrated embodiment may have a variety of added features that an end user may customize based on the information provided by the Caller ID system 265 for a given incoming call. The features may include specialized ringing, call blocking, call forwarding, and the like.

Figure 3:
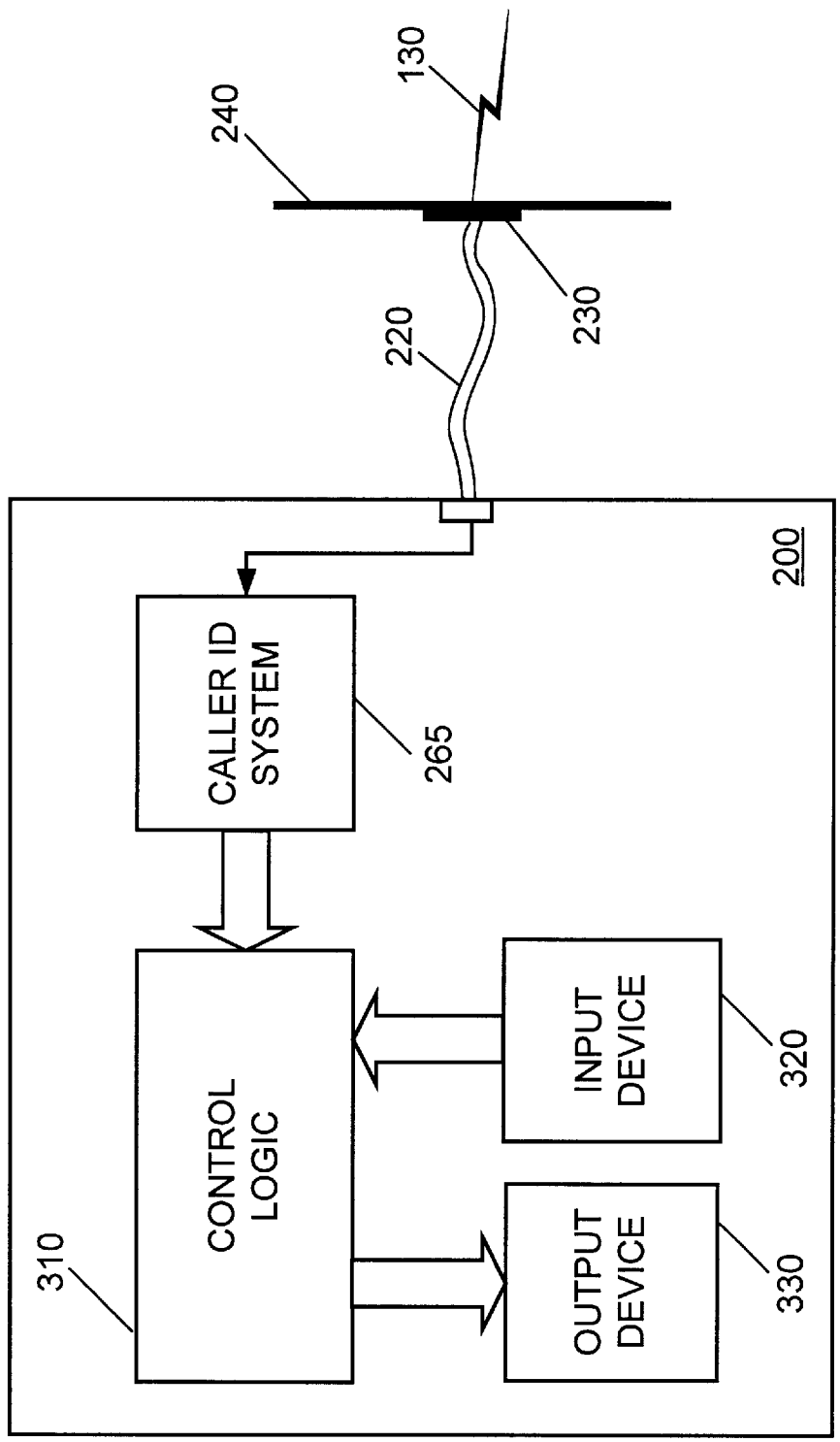
FIG. 3 is a more detailed stylized block diagram of the telephone of FIG. 2 in accordance with the present invention.

FIG. 3 illustrates a stylized block diagram of one embodiment of the telephone 200 of FIG. 2 in accordance with the present invention. More specifically, in the interest of clarity and to avoid obscuring the invention, only that portion of the telephone 200 that is helpful to the understanding of the invention is illustrated. The telephone 200 may be utilized to implement a method of FIG. 4 in accordance with the present invention. The method of FIG. 4 begins at block 410, wherein the telephone 200 detects an incoming call from a calling party. In one embodiment, wherein the telecommunications device 110 is a telephone 200, for example, the incoming call may be detected via a ringing circuit (not shown) that is typically employed in the telephone 200. At block 420, control logic 310 of the telephone 200 accesses information provided by the Caller ID system 265 of the telephone 200 that identifies the calling party. The information may include the telephone number and/or name of the calling party. Any of a variety of Caller ID systems 265 may be employed with the present invention. Because Caller ID systems 265 are well known to those skilled in the art, they will not be described in detail herein. At block 430, control logic 310 of the telephone 200 allows the end user to configure at least one telephone feature, such as specialized ringing, call blocking, call forwarding, for example, in response to the information identifying the calling party.

As described in more detail below, the control logic 310 provides the end user with a "configure" option that allows the end user to configure the desired telephone feature or features through the use of an input device 320 and an output device 330 of the telephone 200. In one embodiment, the "configure" option may be enabled or disabled by the end user. The input and output devices 320, 330 may be any one of a variety of devices by which an end user may interact with the telephone 200. Some examples of the input device 320 may include a dial pad, the handset (i.e., voice input), a touch screen, keys, and the like. Examples of the output device 330 may include an LCD, a speaker, and the like. Because the instant invention is not limited to telephones, but rather is applicable to a variety of telecommunications devices, those skilled in the art having the benefit of this disclosure will appreciate that the type of input and output devices 320, 330 employed may vary, depending on the particular telecommunications device being employed. For example, for DPS applications, such as the Internet Phone, an input device may be a mouse or a keyboard, and the output device may be a screen.

Figure 4:
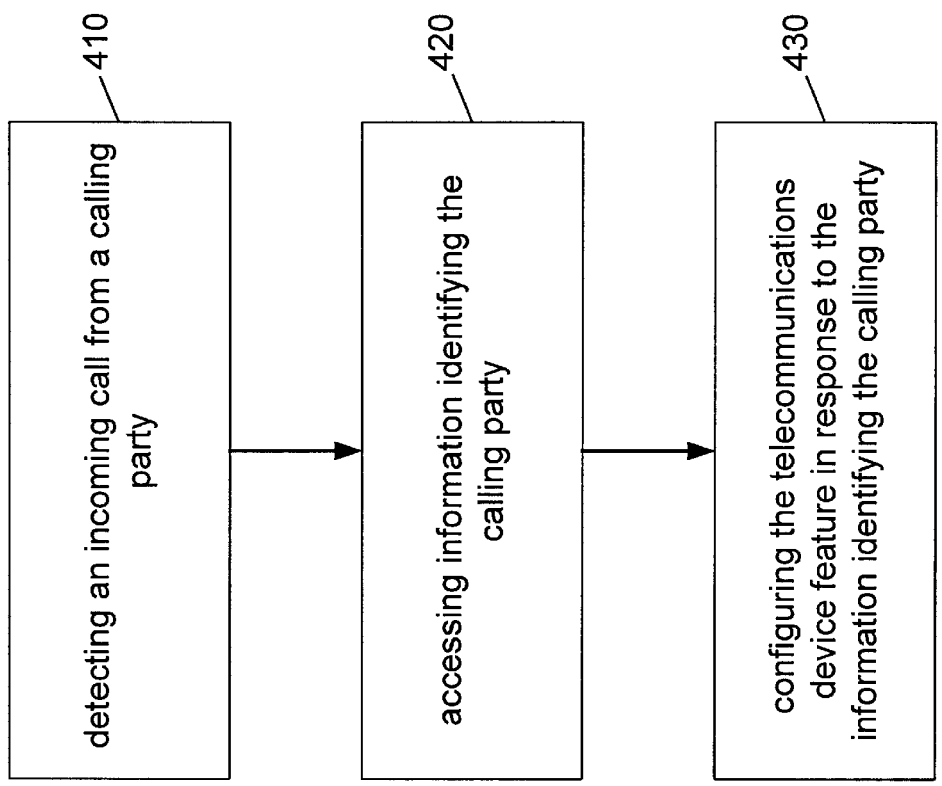
FIG. 4 illustrates a method in accordance with the present invention that may be employed by the telephone of FIG. 3.
Figure 5:
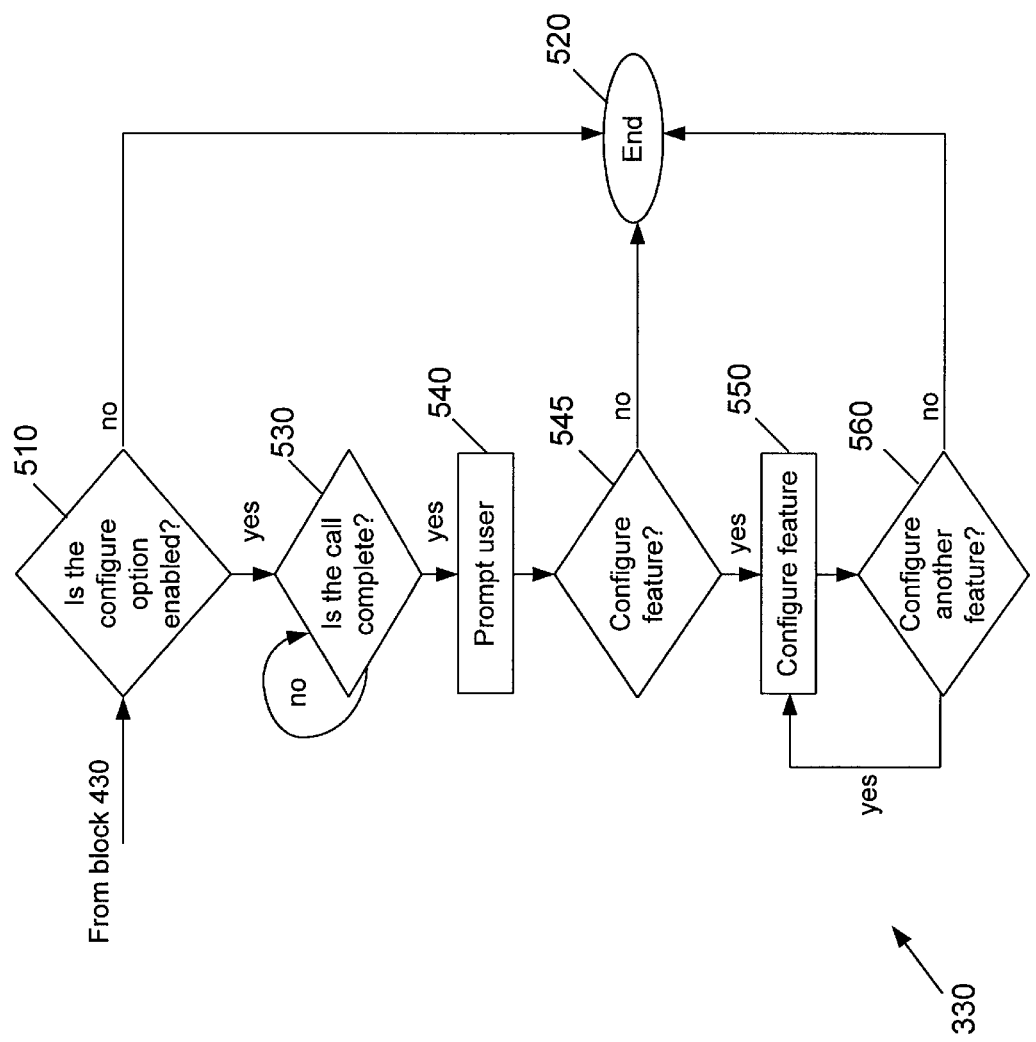
FIG. 5 illustrates a specific embodiment of the method of FIG. 4 in accordance with the present invention.

FIG. 5 illustrates a method that performs the function of the block 430 of the method of FIG. 4. Block 510 of FIG. 5 is a continuation of the block 430 of the method of FIG. 4, which means the control logic 310, at the block 510, has access to the information identifying the calling party, as provided by the Caller ID system 265. At the block 510, the control logic 310 determines if the "configure" option is enabled or disabled. If the option is disabled, then it is presumed that the end user wishes not to configure incoming calls, and, hence, the method ends at block 520.

If the "configure" option is enabled, then, at block 530, the control logic 310 waits for the call to complete before prompting the end user, at blocks 540 and 545, with a choice of configuring a telephone feature in response to the information provided by the Caller ID system 265. The completion of a phone call may be determined in a variety of ways, depending on the application. For example, the end of a phone call may be determined, for the telephone 200, by detecting an on-hook signal, and, for a DPS application, such as an IP Phone, the end of the phone call may be determined by detecting a selection of the "hang-up" button (not shown). It is contemplated that in other embodiments it may not be necessary to wait for the call to complete before prompting the end user with a choice of configuring a particular telephone feature for the incoming call. Additionally, it is contemplated that at the block 540, the prompt may be accompanied with a sound or other attention-getting means to alert the end user that a user input is desired. Again, depending on the telecommunications device 110 (see FIG. 1) employed, other prompts may include a display change, a new window pop-up, and the like.

At the block 545, if the end user wishes not to associate the incoming call with a telephone feature, the method ends at the block 520. If, on the other hand, the end user wishes to associate the incoming call with a supported telephone feature, then, at block 550, the end user is provided with a menu of options to associate the incoming call with the desired feature. The menu of options may be presented via the output device 330. Because the information pertinent to the incoming call is already available to the control logic 310 via the Caller ID system 265, the end user no longer needs to manually input the information for the incoming call. Instead, the end user need only configure the telephone 200 for the desired feature via the input device 320. In one embodiment, if the control logic 310 detects an incoming call that has been previously configured, then the end user may be provided with an option of updating the existing configuration. Or, in an alternative embodiment, in response 110 to determining that an incoming call has been previously configured, the control logic 310 may not prompt the end user at all, and, instead, skip to the block 520 to terminate the configuration process. It is contemplated that the end user may not wish to be repeatedly prompted for calls that may have been configured previously. At block 560, the end user is allowed to configure additional features that are supported by the telephone 200. When the end user completes the configuration, the method ends at the block 520.

Those skilled in the art will appreciate that the control logic 310 may be implemented in hardware, software, or any combination thereof, by those having the benefit of this disclosure. Furthermore, it should be appreciated that the instant invention is not limited to a telephone 200, and may be implemented in any telecommunications device 110 (see FIG. 1). For example, in a telecommunications device comprising a DPS operating in conjunction with a telephone, it may be possible to implement the instant invention in the DPS, wherein the telephone provides the basic telephony service and the DPS provides all the other control functions.

The instant invention has several advantages in that it allows the end user to easily, efficiently, and conveniently configure features supported by the telecommunications device 110 (See FIG. 1). The instant invention provides an opportunity for the end user to customize the available features in response to substantially all incoming calls. The end user is not required to know the phone numbers to be configured in advance, nor is the end user compelled to look up or remember the phone numbers, and no longer is the user required to manually input each phone number. Furthermore, the end user is not expected to remember how to input and assign a particular feature of the telephone 200 to a phone number. With the instant invention, the end user may make full use of the available telephone features, even if the user manual gets lost or misplaced.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for accessing a feature of a telecommunications device, comprising:

detecting an incoming call from a calling party;

accessing information identifying the calling party;

detecting termination of the incoming call;

providing a user with an option to configure the feature of the telecommunications device using the information identifying the calling party in response to detecting termination of the incoming call; and providing the user with an option to terminate configuring the feature of the telecommunications device in response to determining the incoming call has been previously configured.

2. The method of claim 1, wherein providing information identifying the calling party includes providing a phone number of the calling party.

3. The method of claim 1, wherein providing information identifying the calling party includes providing at least a name of the calling party.

4. The method of claim 1, wherein providing the user with the option to configure the feature of the telecommunications device includes actuating an attention getting device to alert the user for input.

5. The method of claim 1, wherein configuring the feature of the telecommunications device is in response to determining if a configure feature is enabled.

6. The method of claim 1, wherein configuring the feature of the telecommunications device includes skipping configuring the feature of the telecommunications device in response to determining the incoming call has been previously configured.

7. The method of claim 1, wherein configuring the feature of the telecommunications device includes configuring at least one of call forwarding, call blocking, and specialized ringing features in response to the information identifying the calling party.

8. The method of claim 1, wherein configuring the feature of the telecommunications device in response to the information identifying the calling party includes configuring a plurality of features of the telecommunications device.

9. A telecommunications device, comprising:

a caller identification system capable of:

detecting an incoming call from a calling party;

determining information identifying the calling party; and detecting termination of the incoming call; and a control logic capable of providing providing a user with an option to configure a feature of the telecommunications device using the information identifying the calling party in response to detecting termination of the incoming call; and providing the user with an option to terminate configuring the feature of the telecommunications device in response to determining the incoming call has been previously configured.

10. The telecommunications device of claim 9, wherein the control logic capable of providing the user with an option to configure the feature of the telecommunications device includes control logic capable of alerting the user for input.

11. The telecommunications device of claim 9, wherein the control logic capable of configuring the feature of the telecommunications device includes configuring in response to determining if a configure feature is enabled.

12. The telecommunications device of claim 9, wherein the telecommunications device supports at least one of call forwarding, call blocking, or specialized ringing features, wherein the control logic capable of configuring the feature of the telecommunications device includes control logic capable of configuring at least one of call forwarding, call blocking, and specialized ringing features in response to the information identifying the calling party.

13. The telecommunications device of claim 9, wherein the caller identification system capable of determining information identifying the calling party includes the caller identification system being capable of determining a phone number of the calling party.

14. The telecommunications device of claim 9, wherein the caller identification system capable of determining information identifying the calling party includes the caller identification system being capable of determining a name of the calling party.

15. The telecommunications device of claim 9, wherein the control logic capable of configuring the feature of the telecommunications device includes control logic capable of configuring a plurality of features of the telecommunications device.

* * * * *